Dec. 17, 1940.   J. McD. IDE   2,225,566
GRAVITY METER
Filed Jan. 22, 1938   2 Sheets-Sheet 1

Inventor: John McDonald Ide
By his Attorney:

Dec. 17, 1940.        J. McD. IDE        2,225,566
GRAVITY METER
Filed Jan. 22, 1938        2 Sheets-Sheet 2

Inventor: John McDonald Ide
By his Attorney:

Patented Dec. 17, 1940

2,225,566

UNITED STATES PATENT OFFICE 2,225,566

GRAVITY METER

John McDonald Ide, Houston, Tex., assignor to Shell Development Company, San Francisco, Calif., a corporation of Delaware Application January 22, 1938, Serial No. 186,423

5 Claims. (Cl. 265—1.4)

This invention pertains to gravity meters used for the measurement of the acceleration due to gravity, and relates more particularly to a gravity meter of the elastic thread type, in which a mass or solid body is rigidly clamped to a horizontal elastic thread or wire fixedly held between two rotatable supports, the center of gravity of said mass being radially spaced or off-set with regard to said wire in a plane perpendicular thereto.

By rotating one or both of the supports between which the thread is stretched, a desired amount of twist or torsion may be imparted to the thread, whereby the center of gravity of the mass or rigid body clamped thereto may be moved or rotated about the thread against the action of the force of gravity, the torque or moment developed by the force of gravity applied to the center of gravity of the mass or body being balanced at each instant by the moment or torque developed within the thread due to torsion or twisting. When the center of gravity reaches a position adjoining the so-called point of instability of the mass, the system becomes highly sensitive to changes in the force of gravity acting at different locations, which can thus be accurately measured.

Devices of this type possess, however, the following drawbacks:

(1) Since these gravity meters are at least as sensitive to changes in leveling as to changes of gravity, their accuracy and reliability is reduced due to difficulties of adequately leveling the apparatus and of maintaining the same in a properly leveled condition throughout a series of measurements.

(2) The sensitivity of these gravity meters varies as a function of the changes in the magnitude of the gravity torque, which, in the critical region near the point of instability, results in a sharply non-linear (exponential) calibration curve of narrow range, and makes the use of the apparatus very uncertain and difficult.

(3) Undesirable catenary effects are exerted on the thread by the weight of the body clamped thereto.

It is therefore an object of this invention to provide a gravity meter housed in a suspended casing, whereby the device may be leveled with great accuracy, and maintained in said leveled condition throughout a series of measurements without necessitating an excessive amount of adjustments.

It is another object of this invention to provide a gravity meter in which more than one mass or body is clamped to the elastic thread at spaced points thereof, whereby the sensitivity of the device is made independent of changes in the magnitude of the gravity torque, and a linear calibration scale is readily obtained.

It is a further object of this invention to provide a gravity meter in which the body or bodies clamped to the wire are immersed in a liquid of a suitable specific gravity, whereby catenary effects due to the downward pull of the weight of the body on the thread are eliminated, a desirable damping effect is obtained, and the static stability of the system is improved.

These and other objects of the invention, as well as the construction and operation of a gravity meter forming a preferred embodiment thereof are described below with reference to the attached drawings, wherein.

An understanding of the present invention will be more readily gained through a brief outline of the principle according to which changes in the gravitational constant ($g$) may be measured by means of the present apparatus.

Figure 1:
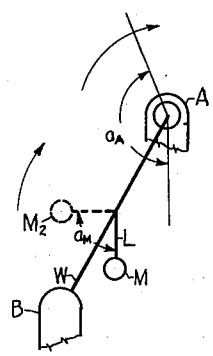
Figs. 1, 2, 3 and 4 are diagrams illustrating the operating principle of the present gravity meter.

Referring to Fig. 1, if a mass M is clamped at the end of a rigid lever arm L to a wire thread W fixedly held between supports A and B, and torsion is applied to the wire thread at the support A, support B remaining stationary, the mass M may be made to assume a position $M_2$, at an angle $a_M$ with the vertical, when the wire at point A has been twisted through an angle $a_A$, greater than the angle $a_M$, the condition of equilibrium obtaining in any such position $M_2$ being due to the fact that the internal torque $T_e$ developed within the elastic wire thread W is equal to the gravitational torque $T_g$ tending to bring the mass M back to the vertical position. Thus, obviously, may be expressed as $T_g = T_e$ or $$gML \sin a_M = K(a_A - a_M)$$

wherein K is the torsion constant of the wire thread.

It may be shown that if the angle $a_A$ is further increased, the mass M will rotate further and will assume a new equilibrium position provided that $$\frac{da_M}{da_A}$$

is finite. If $$\frac{da_M}{da_A}$$

is infinite, any further increase of $a_A$ will make the mass M upset, that is, flip over to the other side of a vertical plane passing through the wire thread.

Differentiating the equation given above, it will be seen that $$\frac{da_M}{da_A}$$

becomes infinite when $$\cos a_M = -\frac{K}{gML}$$

Figure 2:
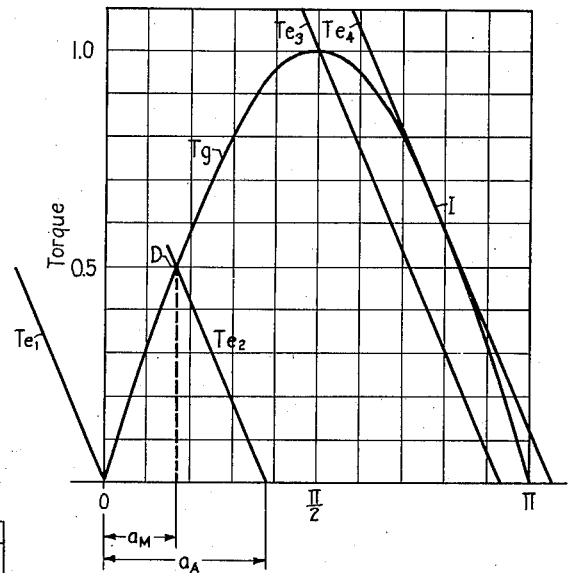

This is shown graphically in Fig. 2, wherein the magnitude of the gravitational and elastic torques is plotted against angular displacement in radians. The gravity torque is represented by the sine curve $T_g = gML \sin a_M$, and the elastic torque by the straight line $T_e = K(a_A - a_M)$, whose slope depends on the value of the torsional constant K. The intersection of these two graphs, as, for example, at point D, gives the magnitude of the two equal torques keeping the system in equilibrium at said point, $a_M$ being the angle formed by the mass M with the vertical, and $a_A$ the angle of twist applied to the wire thread at the support A.

Since, however, the gravitational torque $$T_g = gML \sin a_M$$

increases only to a point $$a_M = \frac{\pi}{2}$$

(the lever arm of the mass M having a maximum effective value at this point), while the elastic torque may be made to increase continuously by twisting the wire thread at point A, there will be reached a point of instability I wherein the two curves will no longer intersect each other, the system becoming at this point unstable or infinitely sensitive to changes in the value of the gravity constant, the slightest change in the latter being sufficient to unbalance the system by upsetting or flipping over the lever supporting the mass M to the other side of a vertical plane passing through the thread W.

In view, therefore, of the extreme sensitivity of the system in the zone adjoining the point of instability, measurements of changes in the value of the gravitational constant may be most effectively carried out in said zone.

Figure 3:
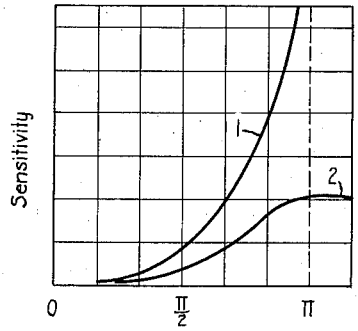

It must, however, be noted that since the sensitivity of the apparatus may be represented by the equation $$S = g\frac{\Delta a_M}{\Delta g}$$

and varies therefore with changes in the gravity torque, this results in a very narrow and strongly non-linear (exponential) scale of readings being obtained in the zone adjoining the point of instability, as represented by curve 1 on Fig. 3. Such scale makes the calibration of the instrument very uncertain and difficult.

In order that a linear, or a near-linear scale, such as represented by curve 2 on Fig. 3 may be obtained over a reasonable range, the sensitivity of the apparatus must not vary with changes of gravity within said range. Since the sensitivity of the apparatus, as stated above, is represented by the equation $$S = g\frac{\Delta a_M}{\Delta g}$$

it can be shown that the scale tends to become linear when the second derivative of $a_M$ with regard to $g$ becomes very small, preferably zero: that is, when $$\frac{d^2 a_M}{dg^2} = 0$$

Figure 4:
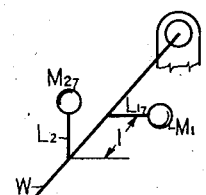

This condition may be obtained, if, instead of one mass M, two equal masses $M_1$ and $M_2$, having equal lever arms $L_1$ and $L_2$ are clamped to the wire at spaced intervals between supports A and B, said masses being arranged substantially at right angles to each other in planes perpendicular to the thread W as shown in Fig. 4.

In this case, a proper selection of the various constants involved will, on the one hand, result in a more nearly linear scale being obtained through the combined effect of the torques involved, and, on the other hand, will control the sensitivity of the apparatus within the desired limits.

In selecting the constants of an apparatus having, for example, two masses $M_1$ and $M_2$ clamped to the wire thread, as shown in Fig. 4, the torsion constant $K_2$ of the thread section between said masses will be:

$$K_2 = \frac{G\pi}{32l}d^4$$

wherein G is the torsion modulus of the material of the thread; $d$ is the diameter of the thread, and $l$ is the length of the thread section between $M_1$ and $M_2$. In such case, the limits of elasticity of the wire will not be exceeded if the expression $$\frac{M_2 L_2}{K_2}g$$

is given a value between 1 and 3, $L_2$ being the lever arm of the mass $M_2$. A linear scale over a desired gravity range will then be given by the following relationship of the constants used:

$$1 + \frac{K_1}{K_2} = \left(\frac{S}{2}\right)^{1/3}\left(1 + \frac{gM_2L_2}{K_2 S}\right)^{2/3}$$

wherein, still with reference to Fig. 4, $K_1$ is the torsion constant of the thread between mass $M_1$ and support A, and S is the sensitivity of the apparatus $$\left(S = g\frac{\Delta a_M}{\Delta g}\right)$$

which is expressed in units of a scale having a value of 100 when a change of 1 milligal $$\left(\frac{\Delta g}{g} = 1 \times 10^{-6}\right)$$

produces the smallest observable angle of shift of the mass $M_2$ (approximately $1 \times 10^{-4}$ radians). The sensitivity of the apparatus is considered satisfactory for example when a twist or rotation of the wire support A through a certain angle cause a 140-fold angular displacement of the mass $M_2$.

Figures 5, 6:
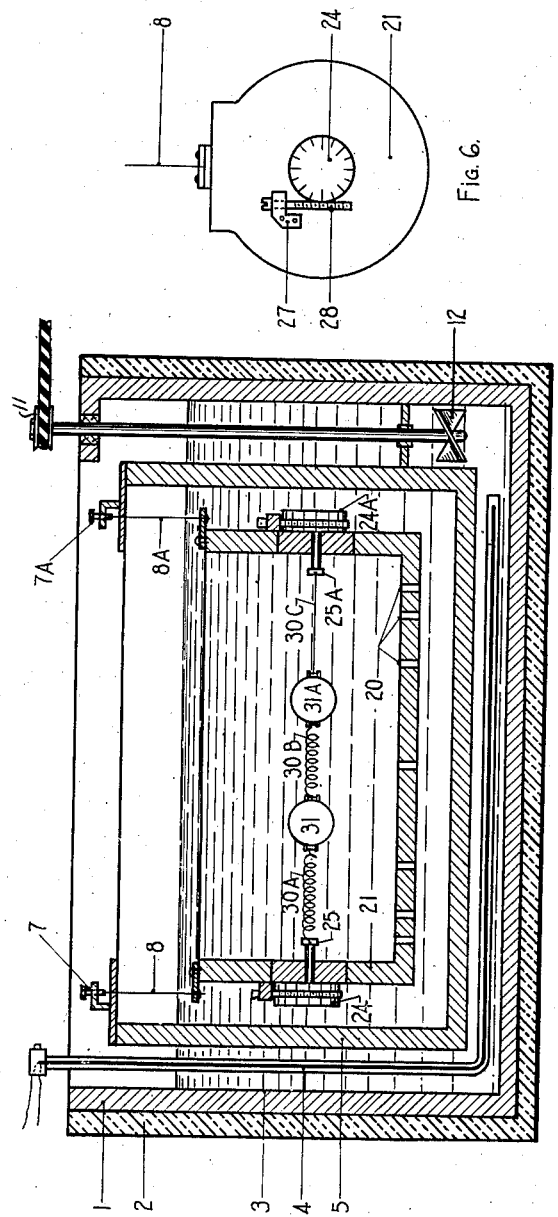
Fig. 5 is a diagrammatic cross-section view showing a preferred construction of the apparatus used in practicing the method of the present invention.
Fig. 6 is an end elevation view of the casing of the present gravity meter.

With the foregoing in view, Fig. 5 represents diagrammatically the arrangement of apparatus used in practicing the present invention.

A box 1, made of aluminum or other non-magnetic metal, is provided with a heat-insulating covering 2, such as asbestos, cork, etc. The box 1 is filled to a desired level with a liquid 3 which is preferably inert, denser than water, and has a small coefficient of thermal expansion and a low vapor pressure, such for example, as xylene, ethylene glycol, methyl phthalate, methyl salicylate. This liquid is kept at a suitable constant temperature such, for example, as 35° C., by means of an electrical heating element 4, connected through a thermostatic controller to a source of electric current. This liquid is agitated by means of a stirring device 12, driven by a pulley 11.

A second box 5, which may be made of the same material as box 1, and filled with the same liquid, is suitably supported within the latter, for the purpose of shielding the inner apparatus from the agitated outer portion of the liquid.

The walls of the box 5 are provided with suitable suspending means, comprising, for example, adjustable screws 7 and 7A, and wires 8 and 8A, by means of which the casing 21 of the gravity meter is suspended within the box 5. The casing 21 could alternatively be suspended on knife edges. The casing 21, after being suspended and properly leveled, does not require further adjustments against lateral departure from a leveled position, and must be corrected only for longitudinal departures from such position, for example, when the device is transported from location to location for gravity measurements. Since longitudinal displacements affect the accuracy of the measurements to a considerably smaller degree than lateral displacements, this arrangement greatly simplifies the problem of maintaining the gravity meter in a leveled position and reduces the number of necessary adjustments. Suitable clamping devices, not shown in the drawings, must be employed to limit or prevent random motion of the various parts of the apparatus while it is being transported from one location to another.

The walls of the casing 21 of the gravity meter are made of silver or gold-plated brass, and are provided with openings 20 which allow the liquid filling the box 5 to enter the casing. The level of the liquid in box 5 must be sufficiently high to permit a complete immersion of casing 21, whereby the effect of any surface tension forces is eliminated.

The end plates or walls of casing 21, are provided with rotatable knobs or bushings 24 and 24A, having suitable means, such as clamps 25 and 25A for holding the elastic wire thread 30A, 30B and 30C stretched between said knobs. As shown in Fig. 6, the outside face of knobs 24 and 24A may be graduated to any desired scale, for example, from 0 to 100. A fine adjustment screw, such as a worm screw 28, is held by a support 27 attached to the end plate of casing 21. The worm screw 28 meshes with the rotatable knob 24, for example, in such a manner that a complete revolution of the screw 28 will rotate the knob 24 through one scale division. It will therefore be seen that in making fine adjustments by means of the screw 28, for example, by rotating it through one hundredth of a revolution, the knob 24 and the wire thread 30 clamped thereto will be rotated through 0.0001 of a revolution.

The wire thread 30, comprising sections 30A, 30B and 30C, stretched within the casing 21, between the knobs 24 and 24A is made of a material having properties of high elastic stability and not susceptible to fatigue with time, such, for example, as quartz, elinvar, etc. A thread of a proper torsion constant may be selected by means of known tests, such for example, as suspending a weight from the thread and measuring its torsional time period.

Figure 7:
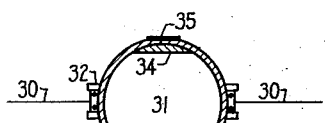
Fig. 7 is a cross-section view of a spherical body adapted to be clamped to the thread of the gravity meter.

One, or, if a rectilinear scale of readings is desired, two bodies of known mass are clamped to the wire thread 30 between the knobs 24 and 24A. According to a preferred embodiment, these masses are made in the form of spheres 31 and 31A, as shown in Figs. 5 and 7.

The spheres 31 are made of a suitable metal or composition, such as sterling silver of gold-plated brass, so that they are chemically stable or inert with regard to the liquid filling the casing 21. Suitable clamping plates 32, as shown in Fig. 7, are affixed to the outside of the spheres 31, and are adapted to clamp the ends of the elastic wire thread 30, which, as stated above, may consist of three sections 30A, 30B and 30C. Any or all of these sections may be formed either of a straight wire thread of any desired cross-section, as shown with regard to 30C, or may be wound in spiral form as shown with regard to 30A and 30B, in order to modify in a desired manner the torsional constants of these wire sections, and the physical dimensions of the sections.

When the ends of the wire sections 30A, 30B and 30C are properly adjusted and clamped between the clamping plates 32 of the spheres 31 and 31A, these sections form with regard to the spheres one single supporting axis passing through the geometrical center or the center of buoyancy of the spheres.

A weight 34 is fixed inside the spheres 31 in any desired manner, for example, by cementing it to the inside wall of each sphere, whereby the center of gravity of the sphere is eccentrically displaced with regard to its axis of support. The spheres 31 are made fluid tight, and their weight is adjusted so as to equal the weight of the liquid which they displace when totally submerged. They exert, therefore, no downward pull on the supporting elastic thread, whereby catenary effects are eliminated, and only the gravity torque due to the eccentric arrangement of the weight 34 comes into consideration.

If more than one sphere, for example the two spheres 31 and 31A shown in Fig. 5, are clamped to the thread in order to obtain, as explained above, a more nearly linear scale of readings, the weights 34 in spheres 31 and 31A are arranged approximately at right angles to each other in a plane perpendicular to the thread. For example, if in sphere 31 the center of gravity of weight 34 lies in a vertical plane passing through the wire thread, the center of gravity of weight 34 of sphere 31A will lie approximately in a horizontal plane passing through said thread.

A narrow portion of the outside surfaces of spheres 31 and 31A is flattened, and a thin mirror strip is cemented thereto, as shown at 35 in Fig. 7. Referring to the example given above, the strip 35 lies in radial alignment with weight 34 in sphere 31, and at approximately a 90° displacement therefrom in sphere 31A.

Figure 8:
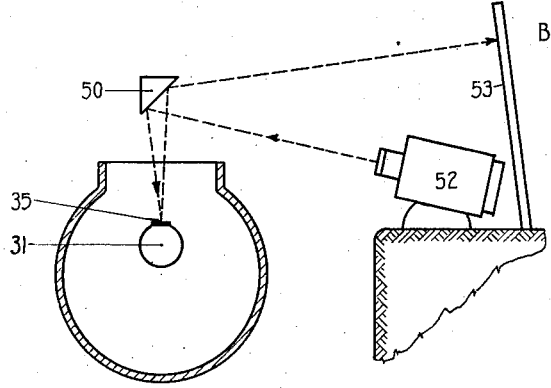
Fig. 8 is a diagrammatic view illustrating the method of effecting gravity measurements by means of the present apparatus.

The apparatus, constructed and assembled in the manner described above, may be checked for sensitivity, calibrated, and used for gravity measurements as follows:

The boxes 1 and 5 and casing 21 are filled with the desired liquid, which is kept at a constant and uniform temperature by means of the heater 4 and stirring device 12. The thread, passing through the casing 21 is then subjected to torsion by rotating one of the knobs 24 and 24A. The twisting of the thread causes sphere 31 to rotate about said thread, its center of gravity moving against the action of the gravitational force. This rotation is continued until the center of gravity of sphere 31 has moved to a position within the zone of instability of the system, the mirror strip 35 occupying at this time approximately its uppermost position, facing the surface of the liquid filling the casing 21. A beam of light is then projected, as shown in Fig. 8, from a light source 52 to a mirror 50, the mirror strip 35, back to mirror 50, and thence to a suitably graduated scale 53.

With the center of gravity of sphere 31 near the point of instability, the knob 24 is rotated further by a very small amount, for example, by rotating the fine adjustment screw 28 through a small angle. The angular displacement of the sphere 31 caused thereby is then calculated from the displacement of the light beam along scale 53. For example, if it is found to be approximately 140 times greater than the angular displacement of the wire at the knob 24, the sensitivity of the apparatus may be held to be satisfactory; if not, it may be necessary to increase it by further adjustments, such as altering the length or torsion constant of the springs or other elastic elements.

If two spheres 31 and 31A are clamped to the wire thread and torsion is applied at knob 24A, the light beam is directed to the mirror strip affixed to sphere 31, that is, to the sphere farthest removed from the point where the thread is twisted, the weight 34 of this sphere being in a position adjacent the point of instability, and the corresponding weight 34 of sphere 31A being angularly displaced by 90° therefrom, in a direction opposite to that of the rotation of knob 24A. The sensitivity of an apparatus having two spheres 31 and 31A clamped to the wire thread may be, if necessary or desired, somewhat increased by decreasing the angular displacement between the weights 34 in said spheres with regard to each other. This adjustment of sensitivity usually requires an angular decrease of the order of less than 5 degrees.

When the sensitivity of the present gravity meter has been properly adjusted, the apparatus is ready for gravity measurements, which may be carried out in any desired manner. For example, the device may be calibrated in a locality of known gravitational constant, and the center of gravity of sphere 31 brought to a position near the point of instability. The gravity meter is then transported to a place where the gravitational constant is to be determined. The apparatus is again properly leveled, and the light beam reflected to the scale 53 as described above. The angular displacement of the light beam on the scale 53 due to a change in the magnitude of the gravity torque applied to the apparatus is used to calculate the difference between the gravitational constants of the two localities.

It is understood that the present device and its mode of operation are susceptible to any changes coming within the scope of the present invention. For example, instead of the scale 53, the light beam may be reflected to a smaller scale placed within the box 1 or casing 21, and the deflections of said beam be read by means of a suitable magnifying device such as a microscope.

I claim as my invention:

1. In a gravity meter, a suspended casing adapted to be filled with a liquid, a thread horizontally clamped within said casing between two supports, at least one rigid body clamped to the thread, said body being immersed in the liquid filling the casing and having a weight substantially equal to the weight of the liquid displaced, the center of buoyancy of said body being located on an axis coincident with the thread, and the center of gravity of said body being radially offset with regard to the thread, and means to move the center of gravity of said body against the action of the gravitational force by twisting the thread.

2. In a gravity meter, a suspended casing adapted to be filled with a liquid, a thread horizontally clamped within said casing between two supports, at least one spherical body clamped to the thread, said body being immersed in the liquid filling the casing and having a weight substantially equal to the weight of the liquid displaced, the center of buoyancy of said body being located on an axis coincident with the thread and the center of gravity being radially offset therefrom, and means to move the center of gravity of said body against the action of the gravitational force by twisting the thread.

3. In a gravity meter, a suspended casing, a thread horizontally clamped within said casing between two supports, two rigid bodies clamped to said thread at spaced points thereof, the centers of gravity of the two bodies being radially offset with regard to the thread and angularly displaced with regard to each other by approximately 90 degrees in a plane perpendicular to the thread, and means to move the center of gravity of at least one of said bodies against action of the gravitational force by twisting the thread.

4. In a gravity meter, a suspended casing adapted to be filled with a liquid, a thread horizontally clamped within said casing between two supports, two rigid bodies clamped to the thread at spaced points thereof, the centers of gravity of said two bodies being offset with regard to the thread and angularly displaced with regard to each other by approximately 90 degrees in a plane perpendicular to the thread, said bodies being immersed in the liquid filling said casing and having a weight substantially equal to the weight of the liquid displaced, and means to move the center of gravity of at least one of said bodies against the action of the gravitational force by twisting the thread.

5. In a gravity meter, a thread horizontally clamped between two supports, two bodies rigidly clamped to said thread at spaced points thereof, the centers of gravity of the two bodies being radially offset with regard to the thread and angularly displaced with regard to each other in planes perpendicular to the thread, and means for rotating the center of gravity of at least one of said bodies about the thread by twisting said thread.

JOHN McDONALD IDE.